(12) United States Patent
Li et al.

(10) Patent No.: US 10,433,037 B2
(45) Date of Patent: Oct. 1, 2019

(54) PROTECTIVE APPARATUS FOR SOUND-ABSORBING PARTICLES IN SOUNDING APPARATUS

(71) Applicant: Goertek.Inc, Shandong (CN)

(72) Inventors: Zhenjun Li, Shandong (CN); Gang Chen, Shandong (CN); Yun Yang, Shandong (CN)

(73) Assignee: Goertek Inc., Shandong (CN)

( * ) Notice: Subject to any disclaimer, the term of this patent is extended or adjusted under 35 U.S.C. 154(b) by 242 days.

(21) Appl. No.: 15/540,180

(22) PCT Filed: Dec. 9, 2015

(86) PCT No.: PCT/CN2015/096752
§ 371 (c)(1),
(2) Date: Jun. 27, 2017

(87) PCT Pub. No.: WO2016/141740
PCT Pub. Date: Sep. 15, 2016

(65) Prior Publication Data
US 2018/0020273 A1    Jan. 18, 2018

(30) Foreign Application Priority Data
Mar. 6, 2015 (CN) ................... 2015 2 0132827 U

(51) Int. Cl.
*H04R 1/28* (2006.01)
*H04M 1/03* (2006.01)
*H04R 1/02* (2006.01)

(52) U.S. Cl.
CPC ............ *H04R 1/02* (2013.01); *H04R 1/2853* (2013.01); *H04R 1/2888* (2013.01); *H04M 1/035* (2013.01)

(58) Field of Classification Search
CPC .. H04R 1/2853; H04R 1/2888; H04R 1/2876; H04R 1/288; H04M 1/035
(Continued)

(56) References Cited

U.S. PATENT DOCUMENTS 4,657,108 A * 4/1987 Ward .................. H04R 1/2803
181/149
7,743,877 B2 * 6/2010 Saiki .................... H04R 1/2803
181/148
(Continued)

FOREIGN PATENT DOCUMENTS

CN        102724606 A    10/2012
CN        104038855 A    9/2014
(Continued)

OTHER PUBLICATIONS

International Searching Authority, International Search Report (ISR) and Written Opinion for International Application No. PCT/CN2015/096752, dated Feb. 22, 2016, 11 pages, State Intellectual Property Office of the P.R.C., China.

*Primary Examiner* — Jeremy A Luks
(74) *Attorney, Agent, or Firm* — Alston & Bird LLP

(57) ABSTRACT

A protective apparatus for sound-absorbing particles (4) in a sounding apparatus, comprising a housing (1) and a rear acoustic cavity formed inside the housing (1). The rear acoustic cavity is filled with sound-absorbing particles (4). A sound circulation channel (5) communicating the rear acoustic cavity with the outside is provided on the housing (1). A sound transmission layer (3) used for preventing the sound-absorbing particles (4) from being exposed covers an entrance of the sound circulation channel (5). The sound transmission layer (3) of the protective apparatus separates
(Continued)

the sound circulation channel (5) from the rear acoustic cavity, such that airflow in the rear acoustic cavity passes through the sound transmission layer (3) and then flows out of the sound circulation channel (5). Configuration of the sound transmission layer (3) can hinder the sound-absorbing particles (4), prevent the sound-absorbing particles (4) from entering the sound circulation channel (5), and do not influence outflow of airflow. The problem in the prior art that sound-absorbing particles (4) are easily exposed or block a sound circulation channel (5) is solved, and the quality of a sounding apparatus is ensured.

4 Claims, 2 Drawing Sheets

(58) Field of Classification Search
USPC .......................................................... 181/151
See application file for complete search history.

(56) References Cited

U.S. PATENT DOCUMENTS

| | | | | |
|---|---|---|---|---|
| 7,974,423 | B2* | 7/2011 | Matsumura | H04R 1/2803 381/166 |
| 8,184,826 | B2* | 5/2012 | Matsumura | H04R 1/2803 181/149 |
| 9,247,341 | B2* | 1/2016 | Lee | H04R 1/2823 |
| 9,648,403 | B2* | 5/2017 | Papakyriacou | H04R 1/2803 |
| 2013/0308812 | A1* | 11/2013 | Shen | H04R 1/288 381/346 |
| 2015/0358721 | A1 | 12/2015 | Wang | |
| 2017/0208386 | A1* | 7/2017 | Yang | H04R 1/22 |
| 2017/0289672 | A1* | 10/2017 | Yang | H04R 1/22 |

FOREIGN PATENT DOCUMENTS

| | | |
|---|---|---|
| CN | 104202703 A | 12/2014 |
| CN | 204408577 U | 6/2015 |

\* cited by examiner

PROTECTIVE APPARATUS FOR SOUND-ABSORBING PARTICLES IN SOUNDING APPARATUS

CROSS REFERENCE TO RELATED APPLICATIONS

This application is a national stage application, filed under 35 U.S.C. § 371, of International Application No. PCT/CN2015/096752, filed Dec. 9, 2015, which claims priority to Chinese Application No. 201520132827.8, filed Mar. 6, 2015, the contents of both of which as are hereby incorporated by reference in their entirety.

BACKGROUND

The present invention relates to the field of sound devices, and more particularly, to a protection device for sound-absorbing particles in a sound device.

With the development of science and technology, people's requirements for the performances of electronic products are also increasing. The sound device as an important constitutional unit of electronic products comprises a rear acoustic cavity defined by a housing, and a single speaker piece arranged in the rear acoustic cavity, wherein a channel that allows air to flow out is arranged on the housing. In the prior art, in order to improve the sound performance of the sound device, people can fill the rear acoustic cavity with sound-absorbing particles. The attendant problem, however, is that the sound-absorbing particles are very small and often obstruct a sound channel or flow from the sound channel to the outside of the sound device, thereby damaging the product's quality. Therefore, it is necessary to provide a protection device for sound-absorbing particles.

BRIEF SUMMARY

An object of the present invention is to provide a protection device for sound-absorbing particles in a sound device.

According to one aspect of the present invention, there is provided a protection device for sound-absorbing particles in a sound device. The protection device comprises a housing and a rear acoustic cavity formed inside the housing. The rear acoustic cavity is filled with the sound-absorbing particles. A sound flow channel which is configured to interconnect the rear acoustic cavity and the outside is arranged on the housing. An acoustic transmission layer which is configured to prevent the sound-absorbing particles from being exposed covers an entrance of the sound flow channel.

Optionally, an inner wall of the housing is provided with a concave sink for accommodating the acoustic transmission layer, and the sound flow channel is communicated with the sink.

Optionally, the sound flow channel comprises a first channel penetrating through a sidewall of the housing and a second channel communicating the first channel and the sink.

Optionally, the protection device further comprises a plate attached to the top of the acoustic transmission layer, and a through hole is arranged in a position, above the acoustic transmission layer, of the plate.

Optionally, the second channel is enclosed by a groove in an inner wall of the housing and the plate.

Optionally, the plate is attached with the acoustic transmission layer in an adhering manner.

Optionally, the plate is a PET plate.

Optionally, the acoustic transmission layer is composed of foams or non-woven fabrics.

A technical effect of the protection device provided by the present invention lies in that: the acoustic transmission layer is arranged at the entrance of the sound flow channel, that is, the sound flow channel and the rear acoustic cavity are separated by the acoustic transmission layer, such that airflow in the rear acoustic cavity flows out from the sound flow channel after flowing through the acoustic transmission layer. The acoustic transmission layer is arranged to hinder the sound-absorbing particles and prevent the sound-absorbing particles from coming into the sound flow channel, without affecting flow-out of the airflow.

Other features and advantages of the present invention will become apparent from the following detailed description of exemplary embodiments of the present invention with reference to the accompanying drawings.

BRIEF DESCRIPTION OF THE FIGURES

The accompanying drawings, which constitute a part of the description, illustrate embodiments of the present invention and, together with the description thereof, serve to explain the principles of the present invention.

Figure 1:
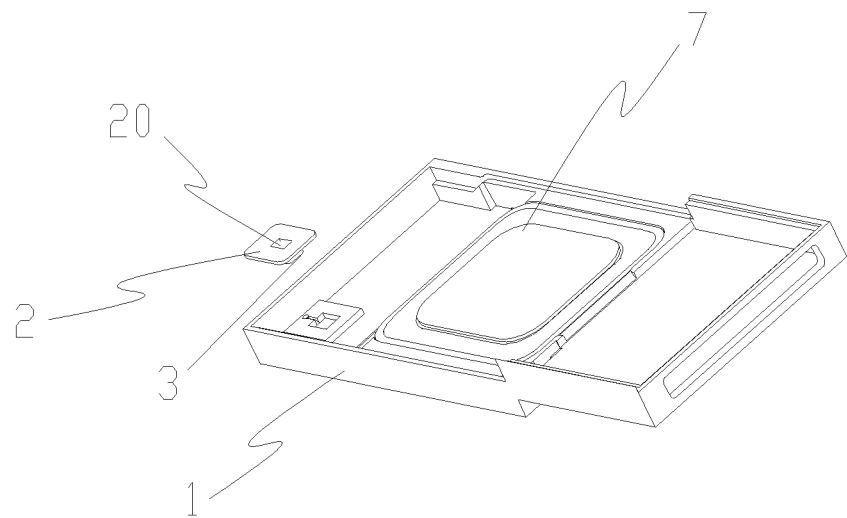
FIG. 1 is an exploded view of a protection device of the present disclosure.

Reference signs in the drawings represent the following components:

1—housing; 2—plate; 3—acoustic transmission layer; 4—sound-absorbing particles; 5—sound flow channel; 6—sink; 7—single sound piece; 20—through hole; 50—first channel; 51—second channel.

DETAILED DESCRIPTION OF VARIOUS EMBODIMENTS

Various exemplary embodiments of the present invention will now be described in detail with reference to the accompanying drawings. It should be noted that the relative arrangement, numerical expressions and numerical values of the components and steps set forth in these embodiments do not limit the scope of the present invention unless otherwise specified.

The following description of at least one exemplary embodiment is in fact merely illustrative and is in no way intended as a limitation to the present invention and its application or use.

Techniques and apparatuses known to those of ordinary skill in the relevant art may not be discussed in detail but where appropriate, the techniques and apparatuses should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, there is no need for further discussion in the accompanying drawings.

Figure 2:
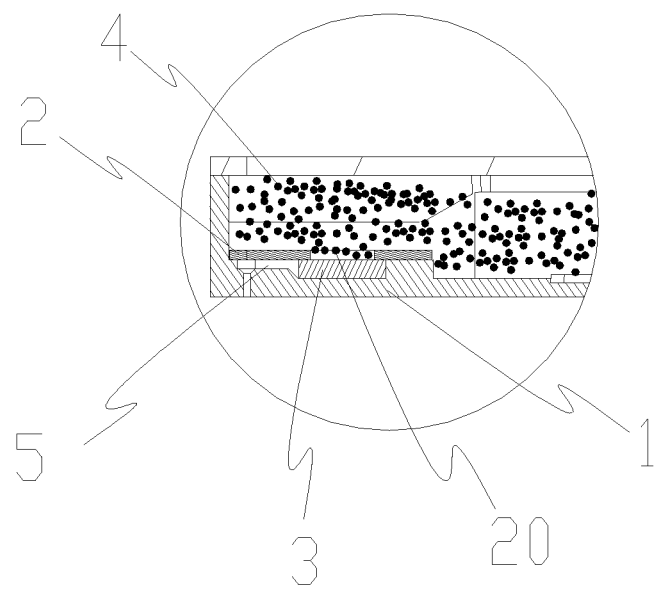
FIG. 2 is a partial sectional view of the protection device in FIG. 1.

Referring to FIG. 1 and FIG. 2, an embodiment of the present invention provides a protection device for sound-absorbing particles in a sound device. The protection device comprises a housing 1 and a single sound piece 7 positioned in the housing 1, wherein the single sound piece 7 separates an inner cavity of the housing 1 into a front acoustic cavity and a rear acoustic cavity. The housing 1 may be formed by buckling an upper casing and a lower casing together, and an intermediate casing may be provided if necessary. Of course, the housing 1 is further provided with a sound flow channel 5. The sound flow channel 5 is configured to interconnect the rear acoustic cavity and the outside, such that airflow flows to the outside from the rear acoustic cavity. The rear acoustic cavity is filled with sound-absorbing particles 4 so as to improve the sound performance of the sound device. An acoustic transmission layer 3 covers an entrance of the sound flow channel 5. The acoustic transmission layer is made of a material which is permeable to airflow, such as foams or non-woven fabrics.

According to the protection device provided by embodiments of the present invention, the acoustic transmission layer is arranged at the entrance of the sound flow channel, that is, the sound flow channel and the rear acoustic cavity are separated by the acoustic transmission layer, such that airflow in the rear acoustic cavity flows out from the sound flow channel after flowing through the acoustic transmission layer. The acoustic transmission layer is arranged to hinder the sound-absorbing particles and prevent the sound-absorbing particles from coming into the sound flow channel, without affecting flow-out of the airflow.

In a specific embodiment of the present invention, the protection device further comprises a plate 2 attached to the top of the acoustic transmission layer 3. The plate 2 may be, for example, a PET plate. A through hole 20 is arranged in a position, above the acoustic transmission layer 3, of the plate 2. The acoustic transmission layer 3 covers the entrance of the sound flow channel 5 via the plate 2, such that the acoustic transmission layer 3 may be well secured. Optionally, the plate 2 is attached with the acoustic transmission layer 3 in an adhering manner. The through hole 20 is arranged in a position, right above the acoustic transmission layer 3, of the plate 2. Airflow induced by the single speaker piece enters the sound flow channel 5 through the through hole 20 and the acoustic transmission layer 3.

Further optionally, an inner wall of the housing 1 is provided with a concave sink 6 for accommodating the acoustic transmission layer 3, wherein the sound flow channel 5 is communicated with the sink 6. During assembly, the foams are encapsulated in the sink 6 via the plate 2. Of course, it is possible to attach the plate 2 with the acoustic transmission layer 3 first, for example, in an adhering manner. Such integrated design of the plate 2 and the acoustic transmission layer facilitates the assembly of a production line.

Figure 3:
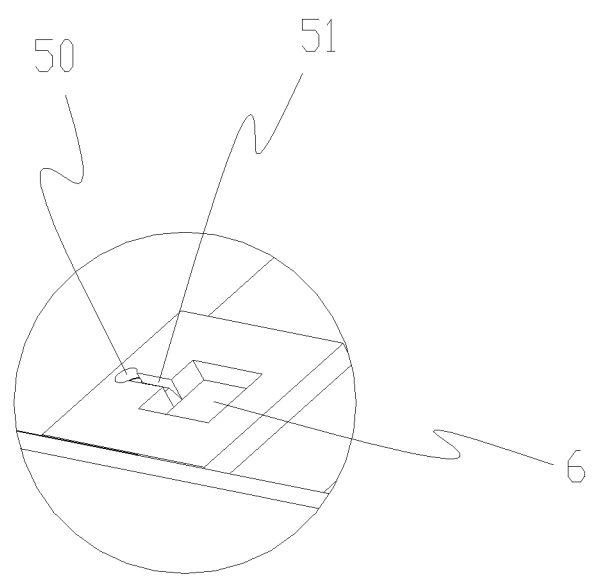
FIG. 3 is a partial enlarged view at a sound flow channel in FIG. 1.

The shape of the sound flow channel 5 may be a structure well-known to those skilled in the art. In one embodiment of the present invention, the sound flow channel 5 comprises a first channel 50 penetrating through a sidewall of the housing, and a second channel 51 communicating the first channel 50 and the sink 6. In the view direction of FIG. 3, the first channel 50 may, for example, vertically penetrate through a bottom wall of the housing 1, and the second channel 50 is approximately horizontal, such that the first channel 50 and the sink 6 are communicated. The second channel 51 may be a groove which is formed in an inner wall of the housing and configured to interconnect the first channel 50 and the sink 6. During assembly, the groove is covered with the plate 2, and the groove and the plate 2 together define the second channel 51.

While certain specific embodiments of the present utility mode have been illustrated by way of example, it will be understood by those skilled in the art that the foregoing examples are provided for the purpose of illustration and are not intended to limit the scope of the present invention. It will be understood by those skilled in the art that the foregoing embodiments may be modified without departing from the scope and spirit of the present invention. The scope of the present invention is subject to the attached claims.

The invention claimed is:

1. A protection device for sound-absorbing particles in a sound device, the protection device comprising:
 a housing;
 a plate; and
 a rear acoustic cavity formed inside the housing,
 wherein:
  the rear acoustic cavity is filled with the sound-absorbing particles;
  a sound flow channel configured to interconnect the rear acoustic cavity and an area outside the device is arranged on the housing;
  an acoustic transmission layer configured to prevent the sound-absorbing particles from coming into the sound flow channel is arranged to cover an entrance of the sound flow channel,
  an inner wall of the housing is provided with a concave sink for accommodating the acoustic transmission layer,
  the sound flow channel is in communication with the sink,
  the sound flow channel comprises a first channel penetrating through a sidewall of the housing and a second channel interconnecting the first channel and the sink,
  the plate is attached to the top of the acoustic transmission layer,
  a through hole is arranged in a position of the plate above the acoustic transmission layer, and
  the second channel is enclosed by a groove and the plate, the groove being formed in the inner wall of the housing for interconnecting the first channel and the sink.

2. The protection device according to claim 1, wherein the plate is attached with the acoustic transmission layer in an adhering manner.

3. The protection device according to claim 1, wherein the is a PET plate.

4. The protection device according to claim 1, wherein the acoustic transmission layer is composed of either foams or non-woven fabrics.

* * * * *